April 2, 1940.　　　G. W. SCHATZMAN　　　2,196,030
FENDER SKIRT MOUNTING
Filed Feb. 26, 1938　　　2 Sheets-Sheet 1
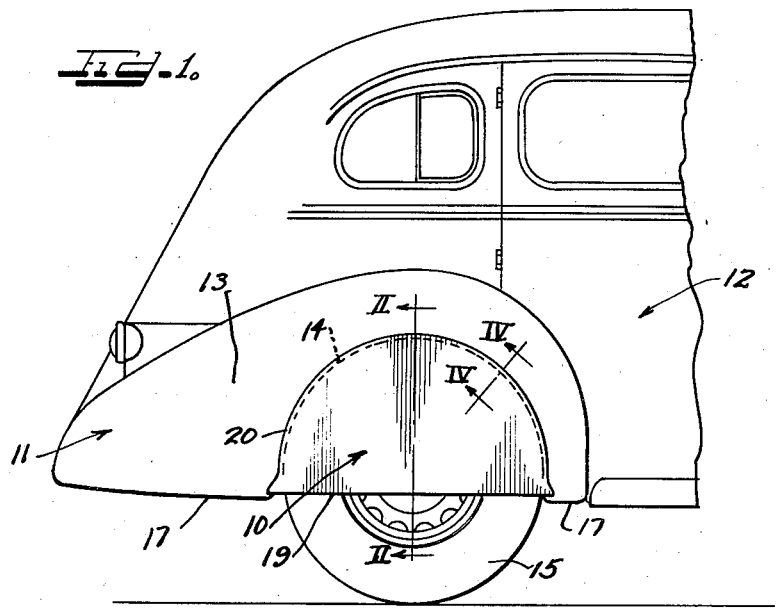
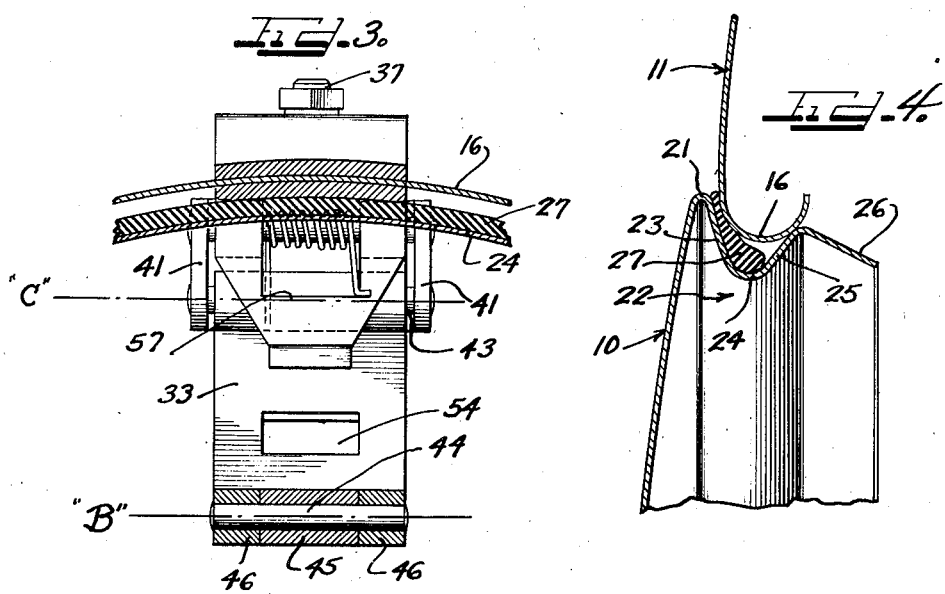
Inventor
GEORGE W. SCHATZMAN.

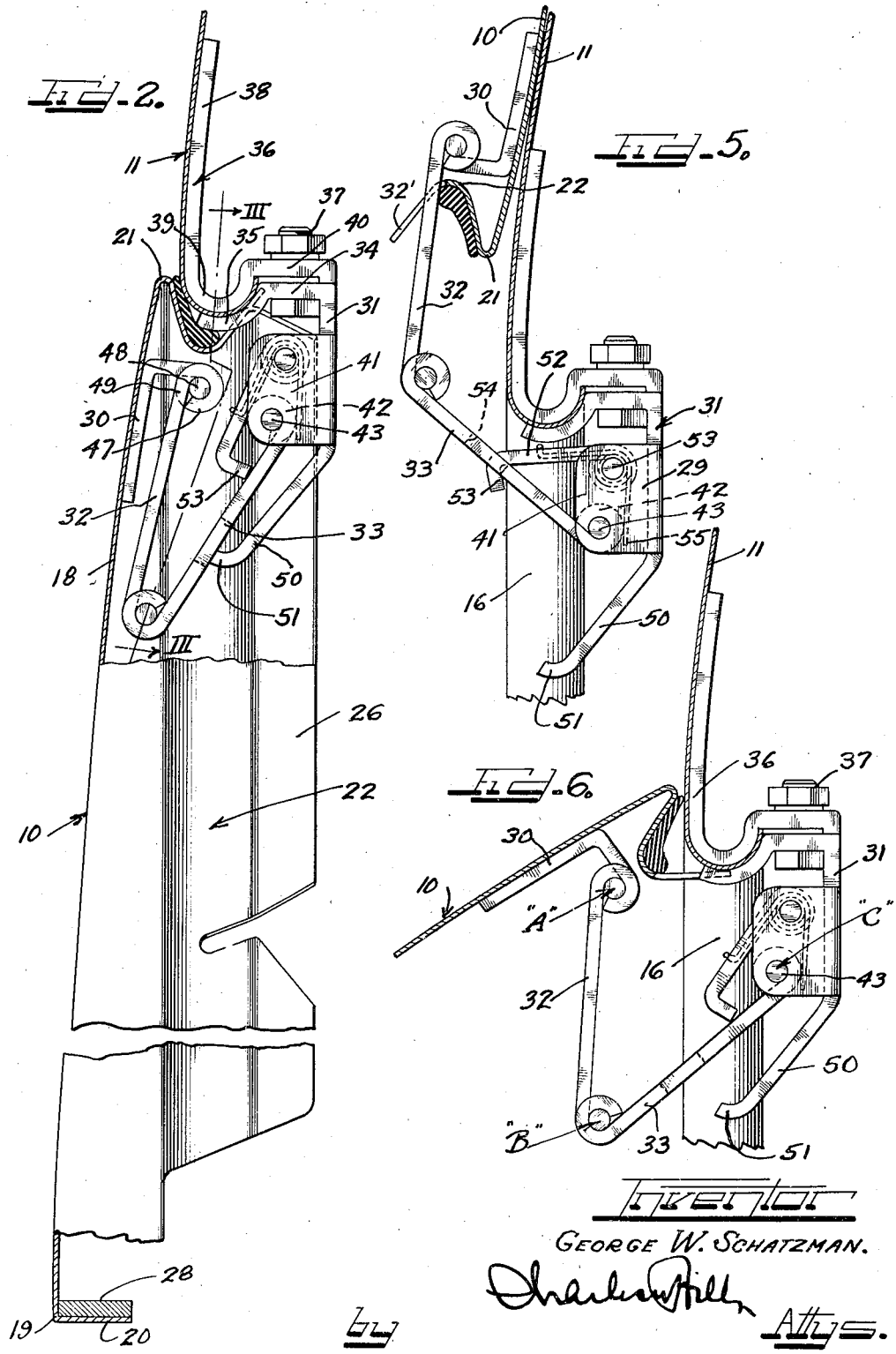

Patented Apr. 2, 1940

2,196,030

UNITED STATES PATENT OFFICE 2,196,030

FENDER SKIRT MOUNTING

George W. Schatzman, Detroit, Mich., assignor, by mesne assignments, to Houdaille-Hershey Corporation, Detroit, Mich., a corporation of Michigan Application February 26, 1938, Serial No. 192,730

9 Claims. (Cl. 280—153)

This invention relates to ornamental fender skirts, and more particularly to a novel means for supporting and securing an ornamental fender skirt to a vehicle fender.

In designing ornamental fender skirts or shields of the type which are adapted to cover the usual wheel access opening in a vehicle fender, it is important that the means which are employed to support and secure the fender skirt in desired position be of such a character as to facilitate the assembly and removal of the fender skirt from the vehicle fender. It has also been found desirable to provide a support and mounting for the fender skirt which will permit partial removal of the fender skirt to permit access to the wheel without completely removing the fender skirt from its mounted position on a vehicle fender. It must also possess a high degree of ruggedness when in use and be substantially free from vibration and noise.

It is an object of this invention to provide a novel ornamental fender skirt and fender skirt mounting which possesses the above highly desirable characteristics.

It is another object of this invention to provide an improved fender skirt and fender skirt mounting which is economical to manufacture and which is rugged and reliable in use.

It is a further object of this invention to provide novel means for supporting the fender skirt and for urging the fender skirt upwardly in the plane of the fender opening.

Another and further object of this invention is to provide a novel fender skirt mounting which can be detached from the vehicle fender when desired but which permits a partial removal of the fender skirt from the wheel opening of a vehicle fender to permit access to the wheel without removal of the mounting means from the fender.

Another and still further object of this invention is to provide a novel multiple hinge fender skirt mounting, one end of which is attached to the fender skirt and the other end of which is arranged to be clamped to a vehicle fender.

Another and still further object of this invention is to provide a novel fender skirt mounting including means for firmly holding the fender skirt in either an opened or closed position over the wheel access opening of a vehicle fender.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a side elevational view of the rear part of an automobile having the usual form of vehicle fender and equipped with an ornamental fender skirt and fender skirt mounting constructed in accordance with the teachings of the present invention;

Figure 2 is a side elevational view partly in cross section taken along the line II—II of Figure 1;

Figure 3 is an enlarged fragmentary cross sectional view taken along the line III—III of Figure 2;

Figure 4 is a fragmentary side elevational view in cross section of the curved edge of the fender skirt as it is seated on the underturned edge of the fender, taken along the line IV—IV of Figure 1;

Figure 5 is an elevational view of the fender skirt mounting as shown in Figure 2, but with the hinge mechanism of the mounting in its open and upper position; and Figure 6 is a view similar to Figure 5, showing the fender skirt mounting in an intermediate position as the fender skirt is being moved from its opened to its closed position.

In Figure 1 of the drawings, I have illustrated a fender skirt 10 constructed in accordance with the teachings of the present invention assembled on a rear fender 11 of an automobile 12. The fender 11 is shown as being of the high crown type, having a downwardly extending outer side wall portion 13, the latter being provided with the usual opening 14 which affords access to the vehicle wheel 15, and which permits ready removal of the wheel 15 in an axial direction. The ornamental fender skirt 10 is disposed over the opening 14 in such a manner as to substantially close the opening and to harmonize with the outer side wall portion 13 of the fender 11. The outer surface of the fender skirt 10 may, of course, be substantially smooth, as is illustrated in the drawings, or it may assume any other desired configuration for the purpose of ornamentation.

The outer marginal edge of the fender 11 which defines the opening 14 is underturned as at 16 (see Figure 4), while the outer marginal edges that define the base of the fender are underturned in a similar manner to define the lower or base edges 17. (See Figure 1.)

As is well known to those skilled in the art, fenders of the high crown type are generally provided with these underturned edge portions to increase the rigidity of the fender. As will presently be understood, the underturned edge 16 forms a convenient attaching portion for securing the fender skirt mounting on the fender 11.

The fender skirt 10 includes a principal part or panel 18 which extends entirely across the wheel opening 14 and slightly overlaps the marginal edge of the vehicle fender. This panel portion 18 terminates in a substantially straight lower edge portion 19 which is bent at substantially a right angle to the panel portion 18 and extends rearwardly to form a base flange 20 (see Figure 2). The curved edge 21 of the panel 18 of fender skirt 10 is provided with an outwardly opening channel-shaped flange 22 which is formed by bending a portion of the material of the fender skirt 10 back on itself as at 23, then rearwardly as at 24, and finally obliquely upwardly as at 25. The obliquely upwardly extending portion 25 is terminated in an obliquely downwardly extending portion 26 to permit the channel-shaped flange 22 to be cammed into seating engagement on the underturned edge 16 of the fender 11.

Although it is not essential to the carrying out of the teachings of the present invention, the fender skirt 10 is preferably provided with means for preventing rattling or other noises resulting from a direct metal to metal contact between the fender skirt and the vehicle fender. This may be conveniently provided by securing a cushioning strip 27 in the channel-shaped flange 22 so positioned as to remain interposed between the skirt 10 and the fender 11 when the former is in its desired assembled position. In order to further reduce noise and vibration, a reinforcing strip 28 is welded or otherwise suitably secured to the base flange 20. This stiffens the lower portion of the fender skirt 10 and reinforces that portion of the fender skirt 10 which is not lying in direct abutting relationship with a portion of the vehicle fender 11.

To secure and mount the fender skirt 10 on the vehicle fender 11, a multiple hinge fender skirt mounting 29 is provided. The fender skirt mounting 29 comprises the sole vertical support for the fender skirt 10 and also permits the fender skirt 10 to be swung outwardly and upwardly away from the opening 14 in the fender 11 so as to permit ready and quick access to the wheel 15 without completely removing fender skirt 10 from the fender 11.

The fender skirt mounting 29 comprises essentially two end fastening arms 30 and 31 and two intermediate link arms 32 and 33 which are pivotally mounted on the fastening arms 30 and 31 respectively and which are also pivotally connected to each other. To facilitate the kinematic discussion of this linking mechanism, the pivot point of intermediate link arm 32 with end arm 30 will be hereinafter referred to as point "A;" the pivot point between intermediate arm 32 and intermediate arm 33 will hereinafter be referred to as point "B" and the pivot point between intermediate arm 33 and fastening arm 31 will hereinafter be referred to as point C.

Now, the end arm 30 of the link mechanism is welded or otherwise suitably secured to the rear face of the fender skirt 10 near the top of the panel 18. The end arm 31 on the opposite end of the link mechanism is arranged to be bolted on to the underturned edge 16 of fender 11 (see Figures 2 and 3). End arm 31 is thus provided with a forwardly extending portion 34 which terminates in a downwardly and forwardly curled end 35 which is shaped to be seated on and intimately engage the under or outer edge of the underturned edge portion 16 of fender 11. The complementary clamping bracket 36 is arranged to engage the opposite side of the underturned edge 16 and be bolted to the forwardly extending portion 34 of arm 31 by a suitable nut and bolt 37. This clamping bracket 36 is provided with an upright leg 38 which is shaped to intimately engage and be seated on the rear face of the fender 11. The clamping bracket 36 is also provided with a portion 39 which is adapted to be seated within the channel formed by the underturned edge 16 and is shaped to intimately engage the inner surface of this channel. The clamping bracket 36 finally includes a rearwardly extending arm portion 40 which is suitably apertured for the reception of the bolt of the nut and bolt assembly 37.

The fastening arm 31 of the link mechanism is also provided with two forwardly extending ears 41 which are disposed in parallel spaced relationship with respect to each other. The ears 41 are preferably formed integral with the principal portion of the end arm 31 of the link mechanism. As will readily be understood from a cursory inspection of the various figures of the drawings, the ears 41 comprise a suitable mounting means for pivotally supporting the intermediate link arm 33. The end of the intermediate link arm 33 adjacent the end arm 31 is curled around as at 42 to form a bearing surface for engaging a hinge pin 43 mounted on the ears 41 of the end arm 31.

The remaining hinge or pivotal joints of the link mechanism of the fender skirt mounting are made in a similar manner. More particularly the two intermediate link arms 32 and 33, are pivotally connected together by means of a hinge pin 44, the mating ends of the two link arms 32 and 33 being formed in a conventional manner as shown. As is shown in Figures 2 and 3 of the drawings, the link arm 33 is provided with a central tongue portion 45 which is curled about to form a bearing surface for the hinge pin 44 and the cooperating end of the link arm 32 is formed with two end tongues 46 which are similarly curled to provide a suitable bearing surface for the hinge pin 44. The opposite end of the intermediate link arm 32 is provided with a centrally disposed tongue portion 47 which is curled to form a suitable bearing surface for a hinge pin 48 carried in two end tongues 49 of the end arm 30 which have been curled to form a suitable bearing surface for the hinge pin 48.

The various means by which pivotal movement of the elements of the link mechanism is obtained have been described above. As will presently be made clear, it is necessary to provide some means for restricting counterclockwise angular movement of the intermediate link arm 33 about the pivot point C. This limiting or stop means may be conveniently provided by forming the end arm 31 of the link mechanism with a downwardly and obliquely forwardly extending portion 50 which terminates in an upwardly turned stop 51. The upwardly turned stop 51 is adapted to abut the intermediate link arm 33 and limit counterclockwise rotation thereof about the pivot point C. While the stop arm 50 may be secured or formed with the fender 11 in any suitable manner, it is preferable to provide this stop arm 50 as an integral part of the end arm 31, as is shown in the drawings.

Means is also provided for detachably retaining the link arm 33, in its upper position as is shown in Figure 5 of the drawings. This means is in the form of a latch 52 which is pivotally mounted on a pivot pin 53 carried by the ears 41. The latch 52 has a downwardly bent free end 53 which is arranged to extend into a rectangular opening 54 in the intermediate link arm 33. The latch 52 is given a counterclockwise bias by means of a spring 55 which is in the form of a spiral spring having one end pressing against the back of the curled end 42 of the intermediate link arm 33 and the other end hooked over and engaging the upper surface of the latch 52. A central portion of the latch 52 is cut out as at 57 to reduce the weight of the latch arm and to permit one end of the spring 55 to pass therethrough to engage the upper surface of the arm 52. The spring 55 causes the latch 52 to remain in constant engagement with the intermediate arm 33 and as the intermediate arm 33 is rotated in a clockwise direction about the pivot point C, the free end 53 of the latch 52 rides along the upper surface of the link arm 33 until the rectangular opening 54 is reached, at which time the free end 53 of the latch 52 drops into the rectangular opennig 54 and engages the lower edge of this opening in arm 33 to restrict counterclockwise rotation of the link arm 33 about the pivot point C. In order to lower the link mechanism, it is necessary to manually lift up the latch 52 against the action of the biasing spring 55.

As is clearly shown in the various figures of the drawings, flange 22 is cut out as at 32' in order to clear the link arm 32 when the link mechanism is in its extended position (see Figure 5). It will be observed that this cut out extends the entire depth of the extreme rear portion 26 of the flange 22 and a substantial distance into the channel portion of the flange 22.

The manner in which the fender skirt mounting hereinbefore described carries out the desired results of the present invention will now be described. Assume that the link mechanism of the fender skirt mounting is in the position shown in Figure 5 of the drawings, with the intermediate link arms 32 and 33 substantially extended and with the fender skirt 10 swung outwardly and upwardly from the opennig 14 of the fender 11 to a position alongside of the body of the car 12. In the position shown in Figure 5, the latch 52 is holding the intermediate link arm 33 in its upper position by virtue of the fact that the free end 53 of the latch 52 is extending through the rectangular opening 54 of the intermediate arm 33. To move the fender skirt 10 into its desired mounted position on fender 11, the latch 52 is manually raised, thereby freeing the bent down end 53 of the latch 52 from the intermediate link arm 33. The fender skirt is then grasped by the hands and the entire assembly is moved downwardly, the intermediate link arm 33 being rotated in a counterclockwise direction about the pivot point C.

As the fender skirt 10 is swung downwardly away from the body of the car 12, the channel shaped flange 22 is moved into a position adjacent the underturned edge 16 of the fender 11, as is shown in Figure 6. At this point in the operation it should be noted that the intermediate link arm 33 is still being pivoted about the pivot point C, but that the fender skirt 10 is now being pivoted about the underturned edge 16, the underturned edge 16 acting as a bearing surface for the channel shaped flange 22 of the fender skirt 10. This pivotal movement of the assembly about two different points is possible by virtue of the fact that the pivot points A and B are both free to move.

As soon as the intermediate link arm 33 strikes the stop arm 50 an entirely new condition exists. The pivot point B now becomes a fixed pivot point, about which the intermediate link arm 32 tends to rotate. The underturned edge 16 of the fender 11, however, is still acting as a pivot point for the fender skirt 10. We see, therefore, that the single point A is now trying to move into different intersecting arcs due to the fact that its movement is being governed by two fixed pivot points. Unless there is a shift of one of these two pivot points or unless there is a foreshortening of one of the link arms, it is clear that further movement would be prevented. The intermediate link arm 32 is made of relatively heavy stock and does not yield or buckle. Similarly, the pivot point B, for the same reason, remains unchanged. The channel shaped flange 22 of the fender skirt 10, however, is made of yieldable material, and for that reason the link arm between the pivot point formed by the underturned edge 16 of the fender 11 and the pivot point A is foreshortened against the resilient action of the material in the flange 22 by continued forward movement of the fender skirt 10 into the opening 14 of the fender 11. What happens then, is that the point A snaps past center with respect to point B to hold the fender skirt firmly and tightly against the fender 11. This tight engagement of the fender skirt 10 against the fender 11 is maintained by virtue of the fact that, in order for the fender skirt 10 to move out of engagement with the fender 11, it is necessary for the pivot point A of the fender skirt mounting to snap back over center with respect to point B against the resilient action of the channel shaped flange 22.

To obtain access to the vehicle wheel 15, the lower edge of the fender skirt 10 is grasped and given a sharp outward pull which snaps the pivot point A back over center and the fender skirt may then be lifted outwardly and upwardly until it assumes the position as indicated in Figure 5 of the drawings. In this position the fender skirt 10 rests against the upper front face of the fender 11 and downward movement of the intermediate link arm 33 is prevented by virtue of the latch 52. The fender skirt 10 will remain in this position without being held while any necessary work is done on the wheel 15, such as the removal thereof from the axle for the purpose of replacing a flat tire or the like.

If it is desired to completely remove the fender skirt from the vehicle fender and not to use it at all, it is simply necessary to unscrew the bolt and nut assembly 37 and lift the fastening arm 31 of the link mechanism and the clamping bracket 36 which cooperates therewith from the fender 11. By virtue of this removable feature of the link mechanism from the fender 11, it will readily be appreciated that this fender skirt mounting may be assembled on any vehicle fender of the high crown type having a curled marginal edge defining the wheel opening of the vehicle fender.

While I have shown a particular embodiment of my invention, it will of course, be understood that I do not wish to be limited thereto, since many modifications may be made, and I, therefore, contemplate by the appended claims to cover all such modifications as fall within the true spirit and scope of my invention.

I claim as my invention:

1. A fender skirt mounting for supporting and securing a fender skirt in desired position on a vehicle fender over the wheel opening thereof, comprising a link mechanism having two end arms and two intermediate link arms, one of said end arms being secured to said fender and the other of said end arms being secured to said fender skirt and said intermediate link arms being pivoted to each other and to said end arms, and a stop for preventing the pivoted together portions of said intermediate link arms from swinging inwardly of the plane of said wheel opening.

2. A fender skirt mounting for supporting and securing a fender skirt in desired position on a vehicle fender over the wheel opening thereof, comprising a link mechanism having two end arms and two intermediate link arms, one of said end arms being secured to said fender and the other of said end arms being secured to said fender skirt, means for preventing one end of each of said intermediate link arms from swinging through said wheel opening, and means for releasably holding said intermediate link arms in extended position to support said skirt in a position away from the wheel opening of said fender.

3. A fender skirt mounting for supporting and securing a fender skirt in desired position on a vehicle fender over the wheel opening thereof, comprising a link mechanism having two end arms and two intermediate link arms, one of said end arms being secured to said fender and the other of said end arms being secured to said fender skirt, the pivot point of the intermediate link arms adjacent said fender skirt being placed so as to snap over past a line joining the pivot point between the two intermediate link arms and the point of engagement of the fender skirt with the fender when said fender skirt is moved to its mounted position.

4. A fender skirt mounting for supporting and securing a fender skirt in desired position on a vehicle fender over the wheel opening thereof, comprising a link having one end supported by said fender and the other end connected to said fender skirt at a point between said first end and the adjacent edge of said fender, said link forming with said fender skirt a toggle mechanism adapted to be held in an overcenter locked position by the inherent resiliency of a portion of said fender skirt.

5. A fender skirt mounting for supporting and securing a fender skirt in desired position on a vehicle fender over the wheel opening thereof, comprising a link carried at one end by a vehicle fender and secured at its other end to said fender skirt, means on said fender for restricting movement away from said fender skirt of the fender end of said link, and means for holding said fender end of said link in an extended position.

6. In combination, a fender having a wheel opening in the side, a fender skirt covering said opening and having a flange fitting around under the edge of said opening at the top of said opening, a link secured at the upper end thereof to said fender skirt by a pivot lying below said flange and approximately parallel to the adjacent portion thereof, and means carried by said fender below said pivot for pivotally supporting the lower end of said link.

7. In combination, a fender having a wheel opening in the side, a fender skirt covering said opening, means on said fender skirt for engaging said fender and preventing upward or outward movement of a portion of said fender skirt with respect to said fender, a link lying below and extending down away from said portion, a pivot connecting the upper end of said link to said fender skirt, and means for pivotally supporting the other end of said link from said fender.

8. In combination, a fender having a wheel opening in the side, a fender skirt covering said opening, means on said fender skirt for engaging said fender and preventing upward or outward movement of a portion of said fender skirt with respect to said fender, a link lying below and extending down away from said portion, a pivot connecting the upper end of said link to said fender skirt, and means for pivotally supporting the other end of said link from said fender, said means being arranged to swing out through said fender opening when said fender skirt is removed from said opening.

9. In combination, a fender having a wheel opening in the side, a fender skirt covering said opening, means on said fender skirt for engaging said fender and preventing upward or outward movement of a portion of said fender skirt with respect to said fender, a link lying below and extending down away from said portion, a pivot connecting the upper end of said link to said fender skirt, and means for pivotally supporting the other end of said link from said fender, said means comprising a link pivotally carried by the fender and able to swing out through the wheel opening and a stop to limit the swinging of said link in the opposite direction.

GEORGE W. SCHATZMAN.